United States Patent [19]

O'Hearne

[11] Patent Number: 5,069,273

[45] Date of Patent: Dec. 3, 1991

[54] FOOD SERVER

[75] Inventor: Robert L. O'Hearne, Kirkwood, Mo.

[73] Assignee: Duke Manufacturing Co., St. Louis, Mo.

[21] Appl. No.: 596,439

[22] Filed: Oct. 12, 1990

[51] Int. Cl.$^5$ .................. A47B 31/02; F25B 13/00; F25B 29/00

[52] U.S. Cl. .......................... 165/12; 99/475; 99/476; 99/483; 99/484; 165/30; 165/61; 165/919; 165/21; 219/386; 219/400; 312/236

[58] Field of Search .......... 99/467, 468, 470, 473-476, 99/477, 483, 484; 312/214, 236; 165/12, 30, 61, 62, 64, 65, 42, 59, 48.1, 21, DIG. 918, DIG. 919; 219/386, 387, 521, 400, 401, 403, 447; 62/382, 388, 237, 371, 419, 457.6, 457.1

[56] References Cited

U.S. PATENT DOCUMENTS

| | | | |
|---|---|---|---|
| 3,222,114 | 12/1965 | Stentz | 312/236 |
| 3,255,812 | 6/1966 | Bayane | 165/27 |
| 3,275,393 | 9/1966 | Stentz et al. | 312/236 |
| 3,516,485 | 6/1970 | Rhoads | 165/27 |
| 3,908,749 | 9/1975 | Williams | 165/2 |
| 3,965,969 | 6/1976 | Williamson | 165/12 |
| 3,999,475 | 12/1976 | Roderick | 99/474 |
| 4,005,745 | 2/1977 | Colato et al. | 165/30 |
| 4,052,589 | 10/1977 | Wyatt | 99/474 |
| 4,156,454 | 5/1979 | Skala | 165/2 |
| 4,156,456 | 5/1979 | Miller | 165/48 R |
| 4,210,675 | 7/1980 | Liebermann | 426/233 |
| 4,285,391 | 8/1981 | Bourner | 219/386 |
| 4,324,445 | 4/1982 | Schaefer | 312/236 |
| 4,397,159 | 8/1983 | Dodd | 62/382 |
| 4,730,100 | 3/1988 | Pingleton | 219/401 |
| 4,776,386 | 10/1988 | Meier | 165/61 |
| 4,884,626 | 12/1989 | Filipowski | 165/12 |

FOREIGN PATENT DOCUMENTS

| | | | |
|---|---|---|---|
| 2444442 | 11/1975 | Fed. Rep. of Germany | 312/236 |
| 2273496 | 1/1976 | France | 312/236 |

Primary Examiner—Timothy F. Simone
Attorney, Agent, or Firm—Senniger, Powers, Leavitt & Roedel

[57] ABSTRACT

A food server for simultaneously cold storing foods to be served hot and foods to be served cold, and for heating the foods to be served hot while keeping cold the foods to be served cold. The server comprises a cabinet having a first insulated food storage compartment for cold storing foods to be served hot and a second insulated food storage compartment, adjacent the first compartment, for cold storing foods to be served cold. The server also includes a mechanism for refrigerating the first compartment, a mechanism for refrigerating the second compartment, a mechanism for heating the first compartment, and a control mechanism for selectively activating and deactivating the mechanisms for heating and refrigerating the first compartment. Because of the control mechanism, the first compartment selectively cools or heats the first compartment depending on whether cold storing or heating of foods stored in the first compartment is desired, so that foods placed in the first compartment are refrigerated for a predetermined duration and then heated without being removed from the first compartment and foods stored in the second compartment are refrigerated while in the second compartment.

21 Claims, 6 Drawing Sheets

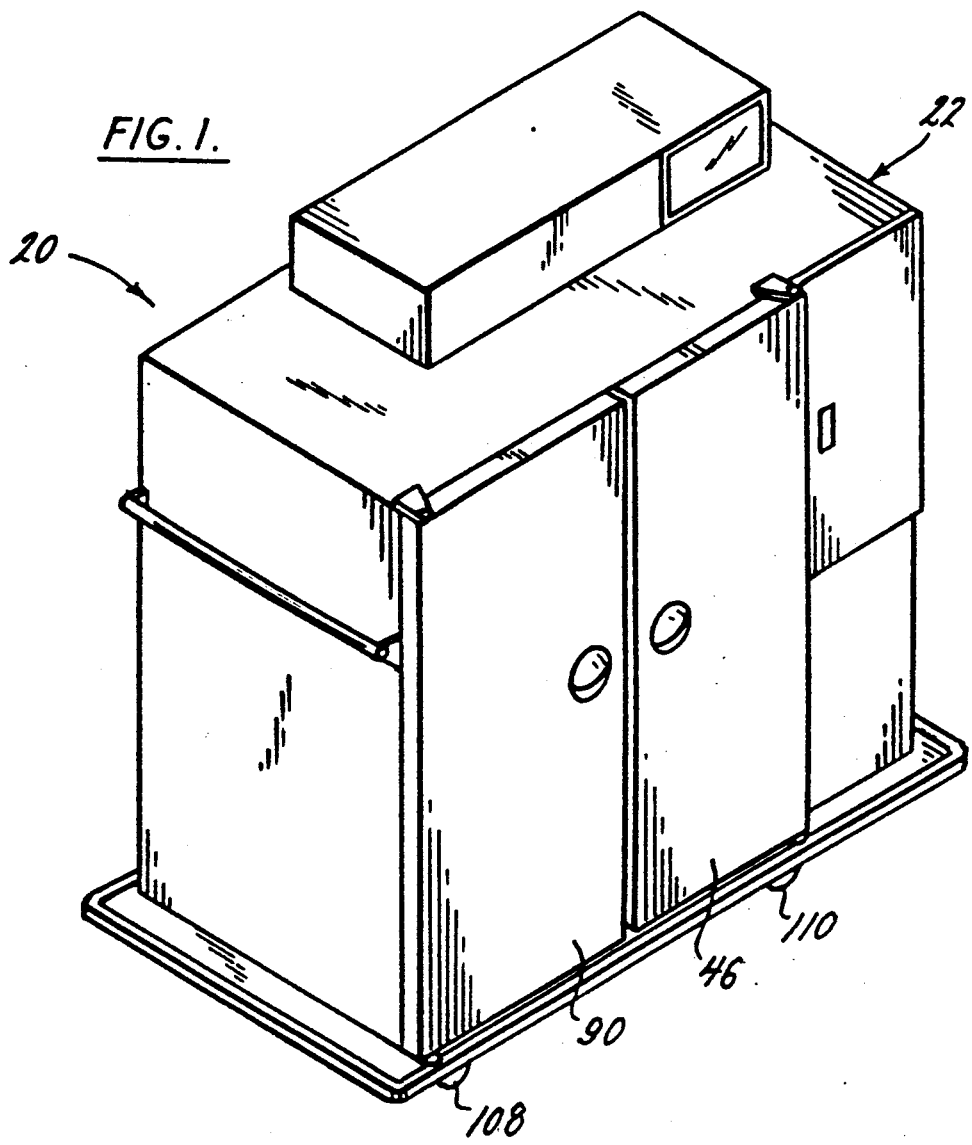
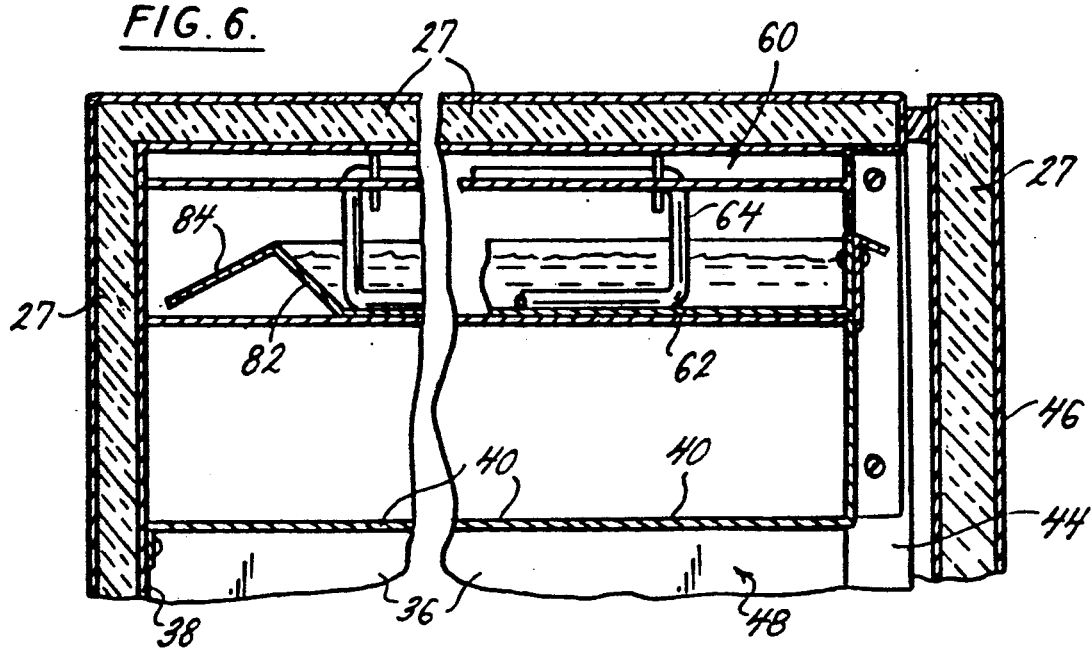

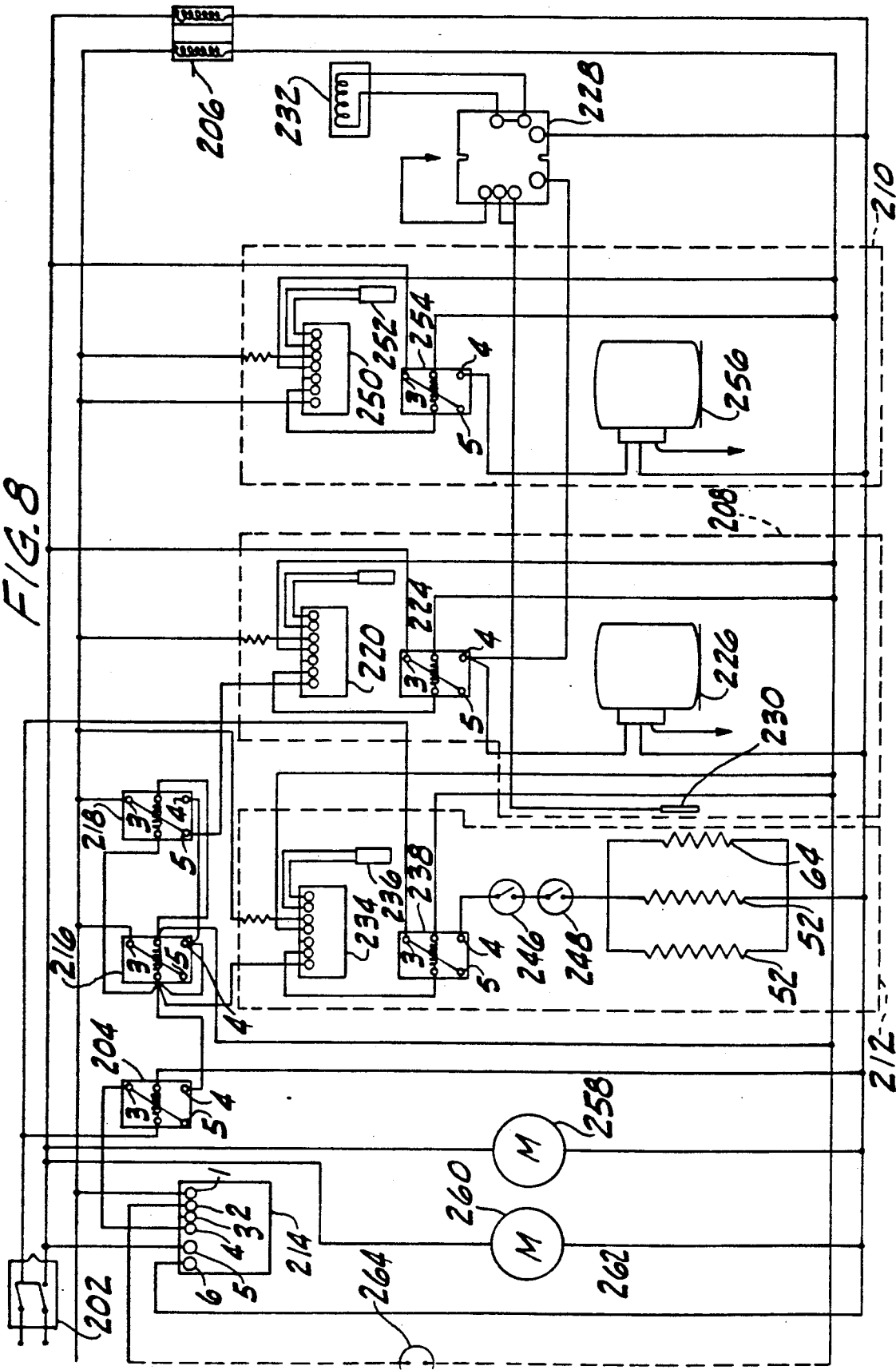

FOOD SERVER

BACKGROUND THE INVENTION

This invention relates generally to food servers, and more particularly to a food server for use in institutions, such as hospitals, for facilitating service of complete meals, having both hot and cold items, to large numbers of people.

Insulated food service carts are commonly used in hospitals for transporting individual meals prepared in a central kitchen to remote serving locations, such as rooms of patients. A problem with such service carts is that the meals must be prepared and placed in the cart shortly before meal time. This is because they often do not have any means for heating the meals once they are placed in the cart. If the meals are not served quickly after being put into the cart, they will not be satisfactorily hot.

Another type of food service cart has both a refrigerating mechanism and a heating mechanism for refrigerating and heating a common receptacle. Foods placed within the receptacle can be refrigerated for an extended period and then heated just prior to being served. A disadvantage of such type of cart is that all foods placed within the receptacle are heated. Thus, it does not facilitate the service of meals having both hot and cold items. Another disadvantage of such type of cart is that such carts generally have no mechanism for controlling the humidity within the receptacle. If the humidity in the receptacle is too low, the heating tends to excessively dry the foods. If the humidity is too high, moisture from the hot air in the receptacle tends to condense on the cool foods.

SUMMARY OF THE INVENTION

Among the objects of the present invention may be noted the provision of an improved food server for facilitating the serving of complete meals having both hot and cold items; the provision of such a food server in which meals can be placed an extended period prior to being served; the provision of such a food server having a food storage compartment for storing foods to be served hot and a separate food storage compartment for storing foods to be served cold; the provision of such a food server having a refrigerating mechanism and a heating mechanism for cooling and heating a common food storage compartment; and the provision of such a food server having means for controlling humidity in a food storage compartment.

Generally a food server of the present invention is adapted for simultaneously cold storing foods to be served hot and foods to be served cold, and for heating the foods to be served hot while keeping cold the foods to be served cold. The server comprises a cabinet having a first insulated food storage compartment for cold storing foods to be served hot and a second insulated food storage compartment, adjacent the first compartment, for cold storing foods to be served cold. The server also includes a mechanism for refrigerating the first compartment, a mechanism for refrigerating the second compartment, a mechanism for heating the first compartment, and a control mechanism for selectively activating and deactivating the mechanisms for heating and refrigerating the first compartment. Because of the control mechanism, the first compartment selectively cools or heats the first compartment depending on whether cold storing or heating of foods stored in the first compartment is desired, so that foods placed in the first compartment are refrigerated for a predetermined duration and then heated without being removed from the first compartment and foods stored in the second compartment are refrigerated while in the second compartment.

These and other advantages will be in part apparent and in part pointed out hereinafter.

BRIEF DESCRIPTION OF THE DRAWINGS

FIG. 1 is a perspective view of the food server of this invention;

FIG. 6 is a sectional view taken along the plane of line 6—6 of FIG. 5 showing the water reservoir;

FIG. 8 is schematic diagram showing the electronic controls for the food server of FIG. 1.

Corresponding reference numerals indicate corresponding parts throughout the several views of the drawings.

DETAILED DESCRIPTION OF THE PREFERRED EMBODIMENT

Figure 2:
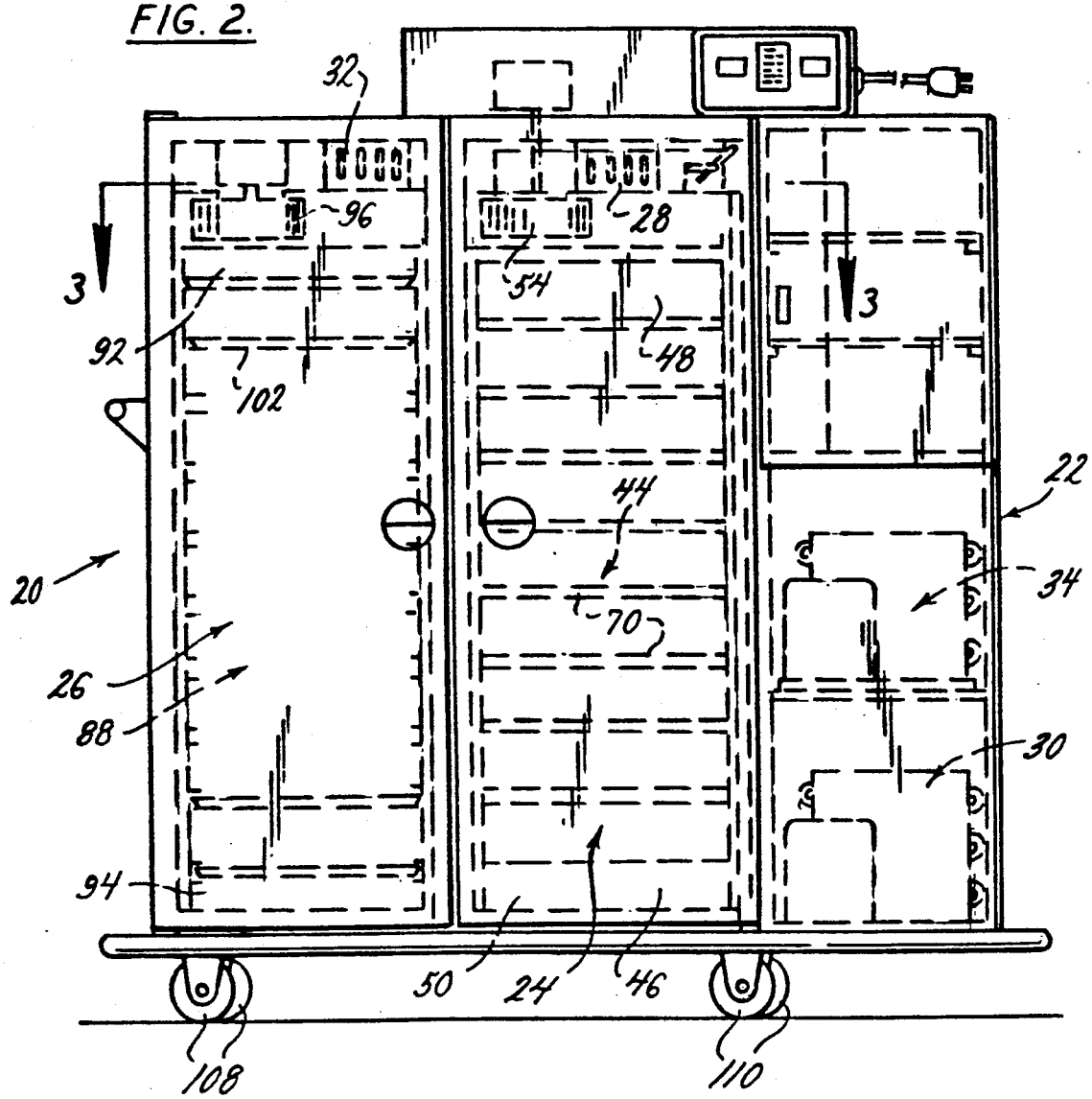
FIG. 2 is a front elevational view of the food server of FIG. 1, with internal components of the food server shown in broken lines.

A food server constructed according to the principles of this invention is indicated generally as 20 in FIGS. 1 and 2. The server 20 is adapted for simultaneously cold storing foods to be served hot and foods to be served cold, and for heating the foods to be served hot while keeping cold the foods to be served cold. The server comprises a cabinet 22 having a first insulated food storage compartment 24 for cold storing foods to be served hot and a second insulated food storage compartment 26, adjacent the first compartment 24, for cold storing foods to be served cold. Insulation 27 surrounds both compartments 24 and 26, for minimizing thermal losses. First and second refrigeration systems (described in greater detail below) cool the first and second compartments 24 and 26, respectively. A heating system (described in greater detail below) heats the first compartment 24. A control system (described in greater detail below) selectively activates and deactivated both the first refrigeration system and the heating system for selectively cooling or heating the first compartment 24 depending on whether cold storing or heating of foods stored in the first compartment 24 is desired. With the control system, foods placed within the first compartment 24 can be refrigerated for a predetermined duration and then heated without being removed from the first compartment 24. The second refrigeration system is independent of the first refrigeration system so that the second compartment 26 is refrigerated regardless of whether the first compartment 24 is being refrigerated or heated. A storage compartment 29 is adjacent the first compartment 24 for storing dishes, utensils, etc.

The first and second refrigeration systems are preferably vapor-compression refrigeration systems. The first refrigeration system includes a first evaporator 28 adjacent an upper region of the first compartment 24, a first compressor, a first condenser, and a first expansion valve. The first compressor, first condenser, and first expansion valve are collectively designated generally as 30 (see FIG. 2). The second refrigeration system includes a second evaporator 32 adjacent an upper region of the second compartment 26, a second compressor, a second condenser, and a second expansion valve. The second compressor, second condenser, and second expansion valve are collectively designated generally as 34. The first refrigeration system constitutes means for refrigerating the first compartment 24 to a temperature below ambient temperature. The second refrigeration system constitutes means for refrigerating the second compartment 26 to a temperature below ambient temperature.

Figure 5:
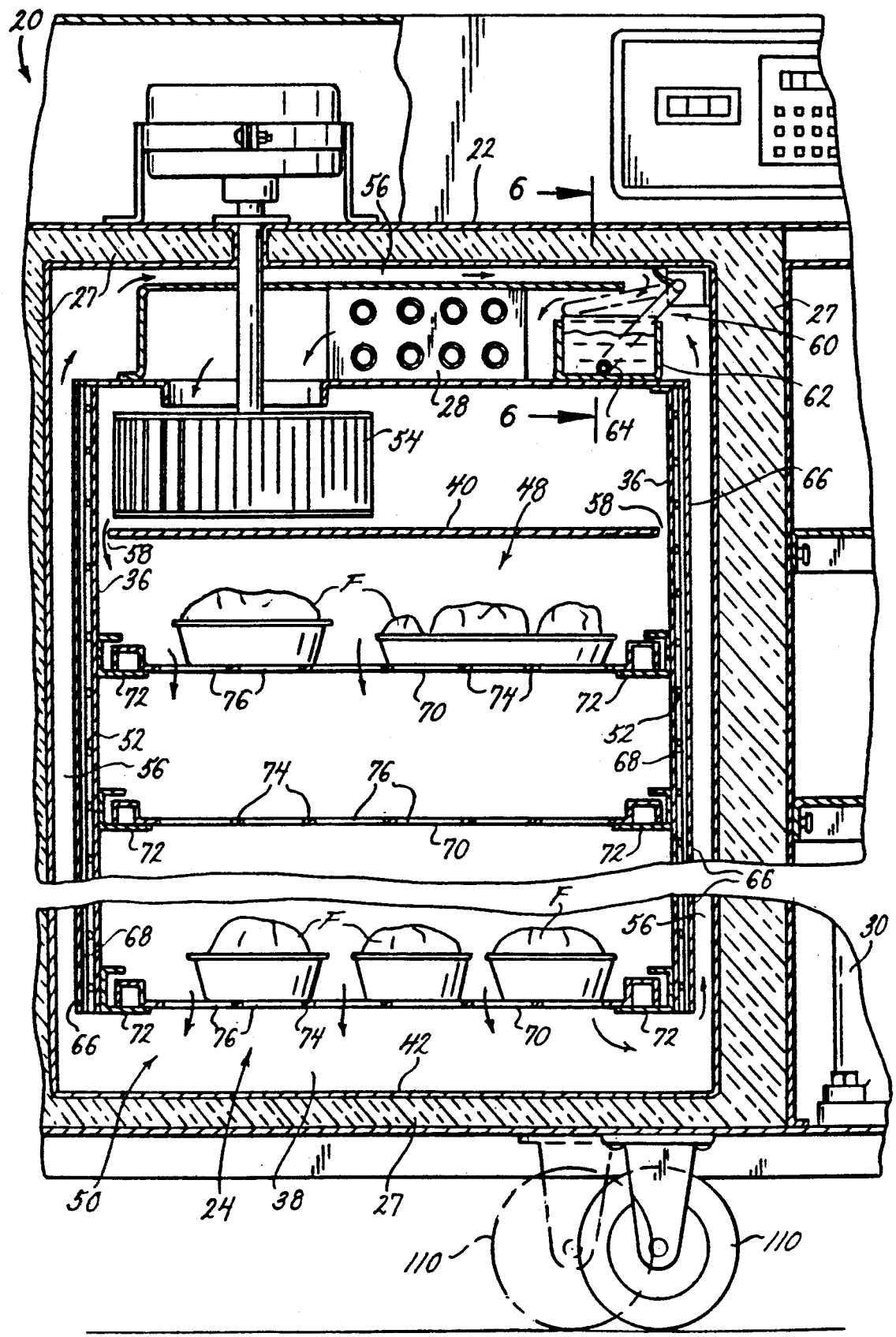
FIG. 5 is a sectional view taken along the plane of line 5—5 of FIG. 3, showing the food storage compartment for storing foods to be served hot.

As shown in FIG. 5, the first compartment 24 is defined between opposing vertical side walls or panels 36, a vertical back wall 38, a horizontal upper panel 40, and a horizontal lower panel 42. The side walls 36 and panels 40 and 42 have outer edges which define a forwardly facing opening 44. A door 46 (shown in FIGS. 1 and 2) is hinged to the cabinet 22 for covering the opening. The first compartment 24 includes an upper region 48, constituting a first region, and a lower region 50, constituting a second region. The heating system comprises heating elements 52 contacting the side panels 36. Preferably, the heating elements 52 are rope foil heaters, such as those manufactured by Ocean States Thermontics, of Johnston, R.I. The heating elements 52 have a foil backing. The foil backing is secured by adhesive to the outer surface of each side panel 36 so that the heating elements 52 contact the panels 36. Preferably, the heating elements 52 contact the panels 36 along nearly the entire lengths of the panels 36. The heating elements 52 heat the side panels 36 which, in turn, heat the first compartment 24. The heating elements 52 constitute means for heating the first compartment to a temperature above ambient temperature.

A first fan (or blower) 54, adjacent the upper region 48, forces air through the first compartment 24 from the upper region 48 to the lower region 50. Return air ducts 56, along the sides of the first compartment 24, return circulating air, forced by the fan 54 to the lower region 50, back to the upper region 48. Thus, the fan 54 constitutes means for circulating air through the first compartment 24. Operation of the fan 54 results in forced convection cooling during cold storage of foods in the first compartment 24 and results in forced convection heating during heating of such foods. During operation of the first refrigeration system, circulating air passes through and is cooled by the first evaporator 28. The cool air is forced by the fan 54 through side openings 58 adjacent the upper panel 40, then forced from the upper region 48 to the lower region 50 to cool food stored within the compartment 24. The circulating air is then forced from the lower region 50, through the ducts 56 and returned to the evaporator 28. This air is constantly recirculated during operation of the first refrigeration system During operation of the heating system, the first refrigeration system is deactivated and the air is circulated by the fan 54 the same as during cooling of the first compartment 24. The heating elements 52 heat the side panels 36. The circulating air is heated as it passes over the hot side panels 36 from the upper region 48 to the lower region 50. Thus, the heating elements 52 and side panels 36 constitute means for heating the circulating air as the air is forced from the first region to the second region.

Humidity is controlled during heating of the first compartment 24 so that heating does not result in foods are too dry or too soggy. Humidity is controlled by a water heater 60 adjacent the upper region 48. The water heater 60 includes a water reservoir 62 and a water heating element 64, constituting means for heating water within the reservoir 62. Water, heated in the reservoir 62, evaporates into the circulating air to increase the humidity of the air in that location to near saturation. The moist air is then heated by the hot side panels 36 and forced through the first compartment. Heating of the air by the hot side panels 36 increases the air's dry bulb temperature. The air, as it is circulated through the first compartment, has a dry bulb temperature in excess of its wet bulb temperature. Thus, the water heater 60 comprises means for inducing humidity in the circulating air as it flows adjacent the return ducts 56 to add moisture to the circulating air before the air is returned to the upper region 48 and before the returned air is heated by the heating elements 52.

The ducts 56 include vertical side panels 66 spaced from the heating elements 52. Sealed air spaces 68 between the heating elements 52 and side panels 66 insulate the ducts 56 so that the ducts are not substantially heated by the heating elements 52. The circulating air is not heated as it passes through the ducts 56. And since the ducts 56 are cool prior to the heating operation and cooler than the circulating air, the circulating air actually cools somewhat in the ducts 56 during initial heating operation. Preferably, the panels forming the ducts 56 are sufficiently thick, e.g., twenty-four gauge stainless steel, so that temperature of food heated in the first compartment 24 increases at a faster rate than the ducts 56. In other words, the thermal lag of the ducts 56 is greater than the thermal lag of the food. Thus, the dry bulb temperature of the circulating air as it passes over the water heater 60 is cooler than when it passes over the food in the first compartment 24. Since the wet bulb temperature of the circulating air cannot be greater than its coolest dry bulb temperature and since the dry bulb temperature of the air is warmer as it passes over the food than when it passes over the water heater 60, then moisture in the circulating air will not condense on the food. At the end of the heating operation the difference between the dry bulb and wet bulb temperatures of the circulating air in the first compartment decreases. This difference decreases because moisture is constantly being added to the circulating air by the water heater 60. Condensation of moisture on the food, however, is not a problem once the temperature of the food approaches the dry bulb temperature of the circulating air. As the food's temperature increases, moisture will not condense on the food even if the humidity of the circulating air approaches saturation. However, if the circulating air is too dry during the final heating of the food, excessive moisture will evaporate from the food and the food will be undesirably dry. By inducing humidity in the circulating air before the air is heated by the heating elements 52, moisture will not condense on the food nor will the food become dry.

Figure 7:
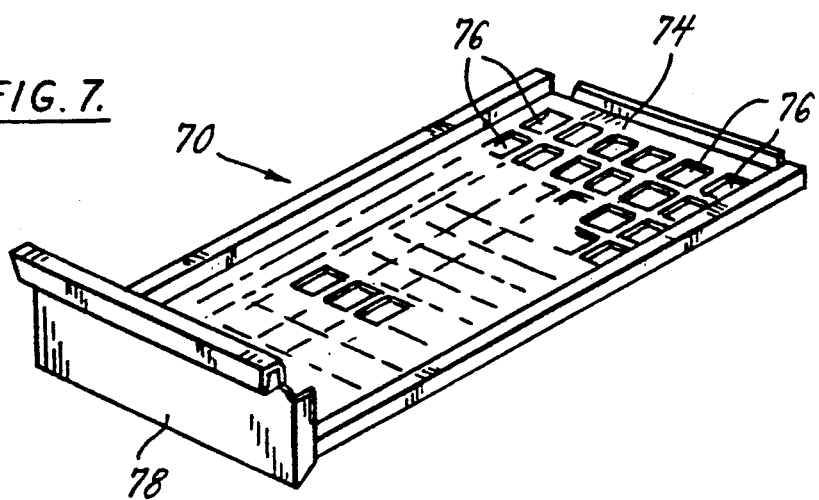
FIG. 7 is a perspective view of a tray removed from the food storage compartment for storing foods to be served hot.
Figure 3:
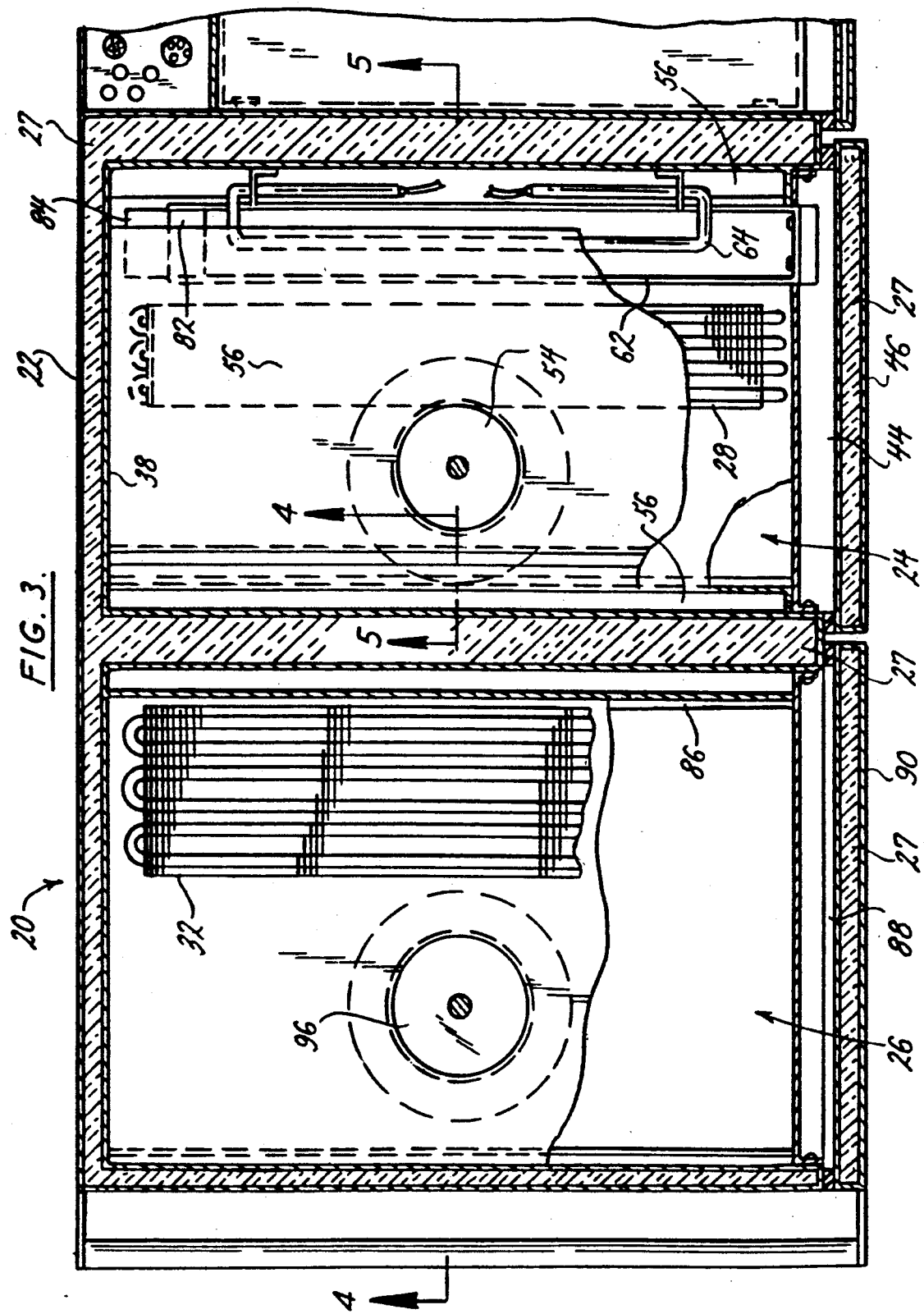
FIG. 3 is sectional view taken along the plane of line 3—3 of FIG. 2.

The first compartment 24 contains a plurality of vertically spaced, horizontally extending trays (or shelves) 70 for holding food (designated generally as F) placed within the first compartment 24. Each shelf 70 is slideably supported by two opposing guides 72 mounted to the side panels 36. The shelves 70 are free to slide on the guides 72 horizontally forward out the opening 44 to facilitate insertion and removal of food from the first compartment 24. As shown in FIG. 7, the bottom of each shelf 70 is formed in a grid 74 having a plurality of apertures 76 for passage of the circulating air therethrough so that the air circulates around the food F. Each shelf 70 also includes a front plate 78 extending generally vertically upwardly from a forward edge of the shelf 70. When all the shelves 70 are slid rearwardly into the first compartment 24, each front plate is closely adjacent the front plates of adjacent shelves 70 to restrict heat loss from the first compartment 24 as the door 46 to the first compartment 24 is opened and one of the shelves 70 is slid forwardly out of the opening 44 to remove hot food F from the shelf.

As shown in FIGS. 5 and 6, the water heating element 64 of the water heater 60 is pivotally mounted adjacent the right-side return duct 56. The element 64 is pivotable between a lower position in which it is positioned within the reservoir 62 and an upper position (shown in phantom in FIG. 5) in which it is positioned above the reservoir 62. The reservoir 62 includes first and second sloped surfaces 82 and 84 for canting the element 64 to its upper position when the reservoir 62 is slid forwardly out of or rearwardly into the first compartment 24. Thus, the surfaces 82 and 84 urge the element 64 up out of the way to facilitate easy removal or insertion of the reservoir 62.

Figure 4:
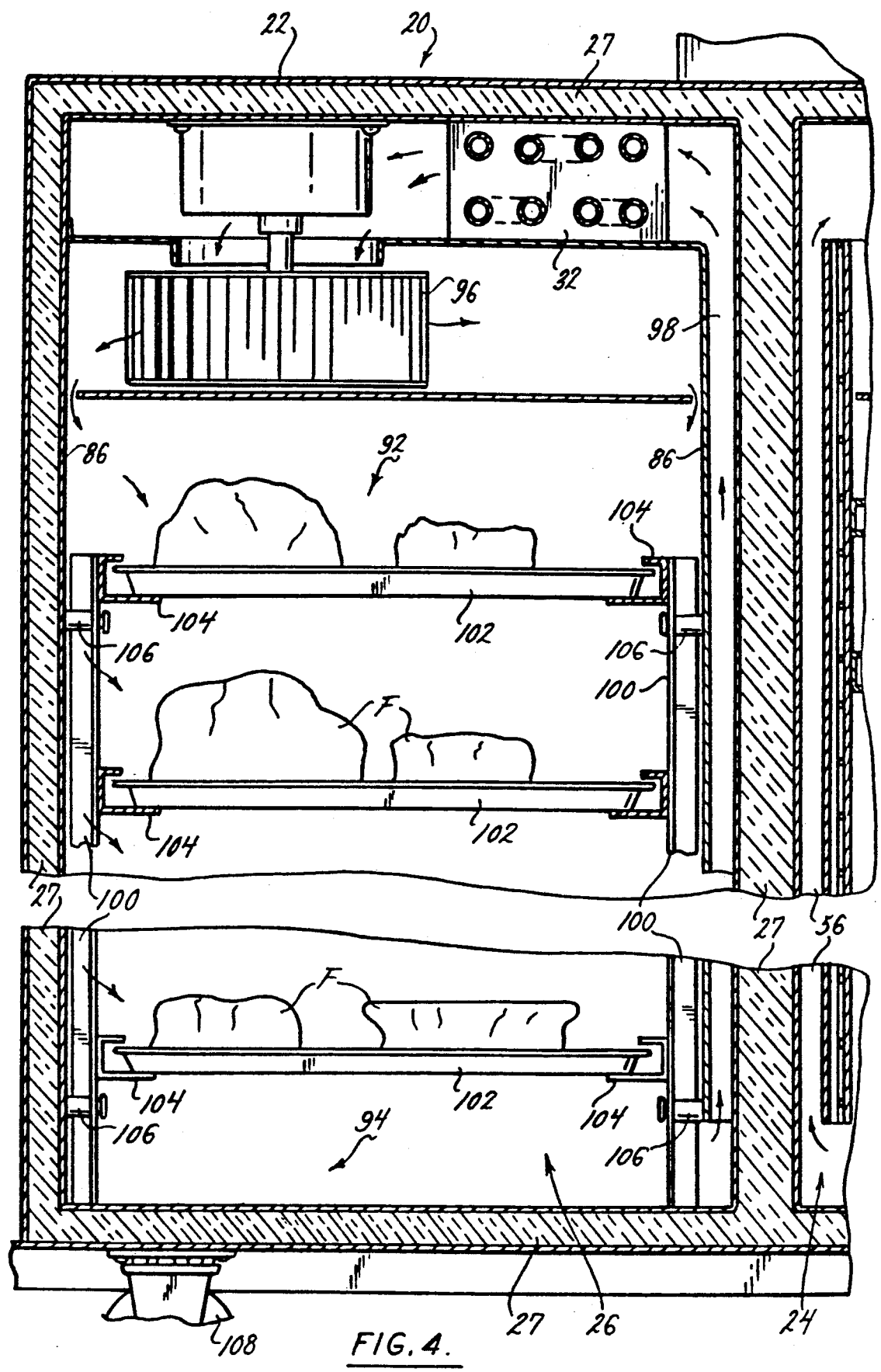
FIG. 4 is a sectional view taken along the plane of line 4—4 of FIG. 3, showing the food storage compartment for storing foods to be served cold.

As shown in FIG. 4, the second compartment 26 is defined between opposing vertical side walls 86. Forward edges of the side walls define a forwardly facing opening 88. A door 90 (shown in FIGS. 1 and 2) is hinged to the cabinet 22 for covering the opening 88. The second compartment 26 includes an upper region 92 and a lower region 94. A second fan (or blower) 96, adjacent the upper region 92, forces air through the second compartment 26 from the upper region 92 to the lower region 94. A return air duct 98, along the right side of the second compartment 26 (as shown in FIG. 4), returns circulating air forced by the fan 96 to the lower region 94, back to the upper region 92. Thus, the fan 96 constitutes means for circulating air through the second compartment 26. Operation of the fan 96 results in forced convection cooling during cold storage of foods in the second compartment 26. During operation, circulating air passes through and is cooled by the second evaporator 32 and then circulated from the upper region 92 to the lower region 94 and then returned through the duct 98.

Within the second compartment 26 is a rack 100 for holding a plurality of food serving trays 102. The rack 100 includes a plurality of opposing tracks 104 for supporting the trays 102. The rack 100 is spaced from the side walls 86 by a plurality of spacers 106 so that circulating air can pass between the trays 102 and the side walls B6.

The server 20 includes a pair of casters 108 adjacent the left hand end of the cabinet 22 (as shown in FIG. 2), and a pair of non-pivoting wheels 110 below the first compartment 24 and attached to the bottom of the cabinet 22. As shown in FIG. 2, the casters 108 are laterally offset and the wheels 110 are laterally offset so that if the server 20 is rolled over a crack or bump in the floor, the two casters 108 or the two wheels 110 are unlikely to hit the crack or bump at the same time. Thus, such offsets minimize jarring of the server 20 as it is rolled over an irregularity in the floor. As shown in FIG. 5, the wheels 110 are located directly below the water reservoir 62. Since the wheels 110 do not pivot, side-to-side movement of the server 20 is minimal at the location of the reservoir 62 and, therefore, water is not likely to slosh over the ends of the reservoir 62 when the server 20 is moved.

Referring to the schematic diagram of FIG. 8, the operation of the food server 20 will be described. Initially, an operator closes master switch 202 to provide 120 vac power to the food server. Closing switch 202 toggles a single pole, double throw, 120 vac relay 204 so that pin 3 is connected to Pin 4. Closing master switch 202 also supplies power to transformer 206 so that 24 vac power is available for the system.

Reference character 208 generally refers to means for refrigerating the first compartment 24 to a temperature below ambient temperature (e.g., 32°-36° F.). Reference character 210 refers to means, independent of the means 208, for refrigerating the first compartment 24, for refrigerating the second compartment 26 to a temperature below ambient temperature (e.g., 32°-36° F.). Reference character 212 refers to means for heating the first compartment 24 to a temperature above ambient temperature. Digital electronic timer 214 constitutes control means for selectively activating and deactivating both the means 208 for refrigerating the first compartment 24 and the means 212 for heating the first compartment 24. Digital electronic timer 214 selectively controls cooling or heating the first compartment 24 depending on whether cold storing or heating of foods stored in the first compartment is desired. As a result, foods placed in the first compartment 24 are refrigerated for a predetermined duration and then heated without being removed from the first compartment 24 and foods stored in the second compartment 26 are refrigerated while in the second compartment. The operator programs the digital electronic timer for the particular periods of time during which cooling and heating are desired.

During the period of cold storing of foods, terminal 4 of digital electronic timer 214 is deenergized so that a 24 vac single pole, double throw, heating relay 216 and a 24 vac single pole, double throw, cooling relay 218 are in the positions as illustrated in FIG. 8. In particular, terminals 3 and 5 of heating relay 216 are connected so that its contacts are open circuited and terminals 3 and 5 of cooling relay 218 are connected so that the means 208 for refrigerating the first compartment 24 is energized. In the illustration position, cooling relay 218 supplies 24 vac power to a refrigeration thermostat 220 for the first compartment 24. Thermostat 220 is responsive to a probe 222 which senses the temperature within the first compartment 24. When the temperature of the air within the first compartment 24 rises above the set temperature of thermostat 220, thermostat 220 toggles relay 224. This relay is a single pole, double throw, 24 vac relay which, when toggled, connects pin 3 to pin 4 to energize a condensing unit 226 for the first compartment 24. Condensing unit 226 cools the first compartment until the set temperature of thermostat 220, as detected by probe 22, is reached. At this point, thermostat 220 turns off so that relay 224 is toggled to the open circuit position deenergizing the condensing unit 226. In addition, relay 224 energizes a liquid level controller 228. While the condensing unit 226 is energized, liquid level controller 228 maintains the water level within reservoir 62. In particular, an electrode 230 positioned within the reservoir 62 detects the level of the water therein. When the level drops below the electrode 230, liquid level controller 228 is energized to open water solenoid 232 thereby opening a valve supplying water to the reservoir 62. The solenoid 232 remains energized so that the reservoir continues to fill until the electrode 230 senses the water level, at which point, controller deenergizes the liquid level controller 228 to close water solenoid 232 and discontinue the supply of water to the reservoir through the valve. The liquid level controller 228, electrode 230 and water solenoid 232 constitute means for maintaining a minimum water level within the reservoir 62.

When the digital electronic timer 214 determines that the period of cold storing of foods has ended and that the period of heating of foods begins, terminal 4 of timer 214 is energized with 24 vac power. This power is transferred through relay 204 to toggle heating relay 216 and cooling relay 218. Toggling relay 216 closes its contacts to connect terminals 3 and 4. Similarly, toggling relay 218 disconnects the 24 vac power to thermostat 220 thereby disabling the means 208 for refrigerating the first compartment 24. The toggling of relay 218 results in the connection of its terminals 3 and 4. As a result, 24 vac power is supplied to a panel heater thermostat 234 for the first compartment 24. Thermostat 234 is set at a preset temperature (e.g., 130° F.) to which the food is to be heated. A probe 236 detects the temperature of the air within the first compartment 24. When the air temperature is below the preset temperature, thermostat 234 toggles relay 238 to connect terminals 3 and 4 energizing the panel heaters 52 and the water heating element (or evaporator heater) 64. The panel heaters continue to heat the air within the first compartment 24 until, as detected by probe 236, the air temperature reaches the preset temperature of thermostat 234. At that point, thermostat 234 toggles relay 238 to open circuit the heaters. During the period that the panel heaters 52 are operating, evaporator heater 64 is also energized to heat the water within reservoir 62 to maintain the humidity within the first compartment 24. The heaters are connected in parallel with each other and in series with a 210° F. thermostat switch 246 and a 230° F. limit switch 248 which limit the maximum air temperature within the first compartment 24. Evaporator heater 64 constitutes means for heating water within the reservoir 62.

During the period that the master switch 202 is closed and the food server is operational, means 210 for refrigerating the second compartment 26 is energized. In particular, a refrigeration thermostat 250 responsive to a probe 252 within the second compartment 26 toggles relay 254 to selectively energize the condensing unit 256 for the second compartment 26. This maintains the temperature n the second compartment 26 below the set temperature of thermostat 250. In addition, a right hand evaporator fan motor 258 for the first compartment 24 is constantly running during the operation of the food server to circulate air in the first compartment 24. Similarly, a left hand evaporator fan motor 260 for the left hand compartment 26 is constantly running during operation of the food server to circulate air therein.

During the period of heating of foods as determined by the digital electronic timer 214, terminal 2 thereof is also energized to illuminate serve light 262 whenever the serve light control switch 264 is closed. Generally, switch 264 is a thermocouple or other temperature responsive switch which closes above a particular temperature, e.g., 130° F. Control switch 264 is located in the first compartment so that energizing of the serve light 262 indicates that the first compartment has reached 130° F. and that the food may be served.

It is to be understood that the cabinet 22 could also contain a water storage tank having fluid lines connected to the water reservoir 62. A solenoid valve could facilitate filling of the water storage tank and a second solenoid valve could be used for transferring water from the tank to the reservoir just prior to heating of the first compartment. With this arrangement, water does not need to be in the reservoir 62 when the food server 20 is transported prior to heating and, therefore, water will not spill from the reservoir 62.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A food server for simultaneously cold storing foods to be served hot and foods to be served cold, and for heating the foods to be served hot while keeping cold the foods to be served cold, the server comprising:

a cabinet having a first insulated food storage compartment for cold storing foods to be served hot and a second insulated food storage compartment, adjacent the first compartment, for cold storing foods to be served cold, said first compartment including a first region and a second region;

means for circulating air through the first compartment comprising a blower for forcing the circulating air through the first compartment from the first region to the second region;

means for refrigerating the first compartment to a temperature below ambient temperature;

means, independent of the means for refrigerating the first compartment, for refrigerating the second compartment to a temperature below ambient temperatures;

means for heating the first compartment to a temperature above ambient temperature comprising means for heating the circulating air; and control means for selectively activating and deactivating both the means for refrigerating the first compartment and the means for heating the first compartment for selectively cooling or heating the first compartment depending on whether cold storing or heating of foods stored in the first compartment is desired, so that foods placed in the first compartment are refrigerated for a predetermined duration and then heated without being removed from the first compartment and foods stored in the second compartment are refrigerated while in the second compartment.

2. A food server as set forth in claim 1 further comprising at least one return duct for returning the circulating air from the second region back to the first region.

3. A food server as set forth in claim 2 wherein the means for heating the circulating air comprises heating elements for heating the circulating air as the air is forced from the first region to the second region.

4. A food server as set forth in claim 3 further comprising means for controlling humidity in the first compartment.

5. A food server as set forth in claim 4 wherein the means for controlling humidity comprises means for inducing humidity in the circulating air as it flows adjacent the return duct to add moisture to the circulating air before said air is returned to the first region and before the returned air is heated by the heating elements.

6. A food server as set forth in claim 4 wherein the means for inducing humidity comprises a water reservoir adjacent the return duct and means for heating water within said reservoir.

7. A food server as set forth in claim 6 further comprising means for maintaining a minimum water level within the reservoir.

8. A food server as set forth in claim 6 wherein said reservoir is located downstream of said return duct.

9. A food server as set forth in claim 3 wherein the first compartment is defined between opposing vertical side walls, said heating elements being adjacent the side walls.

10. A food server as set forth in claim 9 wherein said first region constitutes an upper region of the first compartment and said second region constitutes a lower region of the first compartment, said circulating means forcing the air downwardly through the compartment from the upper region to the lower region and then forcing the air through the return duct to return the air to the upper region for continuously recirculating the air through the first compartment.

11. A food server as set forth in claim 10 further comprising a plurality of vertically spaced, horizontally extending trays within the first compartment for holding food placed within the first compartment, said trays each having a plurality of apertures for passage of the circulating air therethrough.

12. A food server as set forth in claim 11 further comprising means for inducing humidity in the circulating air as it flows adjacent the return duct to add moisture to the circulating air before said air is returned to the first region and before the returned air is heated by the heating elements.

13. A food server as set forth in claim 11 further comprising means for controlling humidity in the first compartment, said means for controlling humidity comprising a water reservoir adjacent the return duct and means for heating water within said reservoir to add moisture to the circulating air before said air is returned to the upper region and before the returned air is heated by the heating elements.

14. A food server as set forth in claim 13 further comprising means for maintaining a minimum water level within the reservoir.

15. A food server for simultaneously cold storing foods to be served hot and foods to be served cold, and for heating the foods to be served hot while keeping cold the foods to be served cold, the server comprising:
a cabinet having first and second adjacent insulated food storage compartments, said first compartment being defined between opposing vertical side walls, a vertical back wall, a horizontal upper panel, and a horizontal lower panel, said side walls and panels having outer edges defining a forwardly facing opening;
a plurality of vertically spaced, horizontally extending trays within the first compartment for holding food placed within the first compartment;
means for slideably supporting the trays between the side walls so that the trays are free to slide horizontally forward out of the opening;
a door secured to the cabinet for covering the opening;
a plurality of vertically disposed front plates each secured to a corresponding one of the trays, each front plate being closely adjacent the front plates of adjacent food trays to restrict thermal losses as the door is opened and one of the trays is slide forwardly out of the opening;
means for refrigerating the first compartment to a temperature below ambient temperature;
means, independent of the means for refrigerating the first compartment, for refrigerating the second compartment to a temperature below ambient temperature;
means for heating the first compartment to a temperature above ambient temperature; and
control means for selectively activating and deactivating both the means for refrigerating the first compartment and the means for heating the first compartment for selectively cooling or heating the first compartment depending on whether cold storing or heating of the food stored in the first compartment is desired.

16. A food server for cold storing foods to be served hot and for heating the foods, the server comprising:
a cabinet having an insulated food storage compartment being defined between opposing vertical side walls, said compartment including a first region and a second region;
means for refrigerating the compartment to a temperature below ambient temperature;
means for heating the compartment comprising means for circulating air through the compartment and means for heating the circulating air, said circulating means comprising a blower for forcing the circulating air from the first region and through the compartment to the second region, said means for heating the circulating air comprising heating elements adjacent the side walls and extending from the first region to the second region;
control means for selectively activating and deactivating both the means for refrigerating the compartment and the means for heating the compartment for selectively cooling or heating the compartment depending on whether cold storing or heating of foods stored in the compartment is desired, so that foods placed in the compartment are refrigerated for a predetermined duration and then heated without being removed from the compartment; and
means for controlling humidity in the compartment during operation of the means for heating the compartment.

17. A food server as set forth in claim 16 further comprising at least one return duct for returning the circulating air from the second region back to the first region.

18. A food server as set forth in claim 17 wherein the means for controlling humidity comprises means for inducing humidity in the circulating air as said air flows adjacent the return duct to add moisture to said air before said air is returned to the first region and before the returned air is heated by the heating elements.

19. A food server as set forth in claim 17 wherein the means for controlling humidity comprises a water reservoir adjacent the return duct and means for heating water within said reservoir to add moisture to the circulating air before said air is returned to the first region and before the returned air is heated by the heating elements.

20. A food server as set forth in claim 19 wherein said reservoir is located downstream of said return duct.

21. A food server as set forth in claim 19 further comprising means for maintaining a minimum water level within the reservoir.

* * * * *

UNITED STATES PATENT AND TRADEMARK OFFICE
CERTIFICATE OF CORRECTION

PATENT NO. : 5,069,273

DATED : December 3, 1991

INVENTOR(S) : Robert L. O'Hearne

It is certified that error appears in the above-identified patent and that said Letters Patent is hereby corrected as shown below:

Column 10, claim 15, line 13, "is slide" should read ---is slid---.

Signed and Sealed this

Thirtieth Day of March, 1993

Attest:

STEPHEN G. KUNIN

*Attesting Officer*  *Acting Commissioner of Patents and Trademarks*